United States Patent [19]

Abdallah et al.

[11] Patent Number: 5,055,837

[45] Date of Patent: Oct. 8, 1991

[54] ANALYSIS AND IDENTIFICATION OF A DRILLING FLUID COLUMN BASED ON DECODING OF MEASUREMENT-WHILE-DRILLING SIGNALS

[75] Inventors: Ali H. Abdallah, Rocky Hill; Donald S. Grosso, West Hartford, both of Conn.

[73] Assignee: Teleco Oilfield Services Inc., Meriden, Conn.

[21] Appl. No.: 579,706

[22] Filed: Sep. 10, 1990

[51] Int. Cl.[5] .............................................. G01V 1/00
[52] U.S. Cl. ...................................... 340/853; 367/83; 175/40
[58] Field of Search ........................ 367/81, 83, 84, 85; 340/853; 175/40

[56] References Cited

U.S. PATENT DOCUMENTS

| | | | |
|---|---|---|---|
| 3,895,343 | 7/1975 | Farr | 367/190 |
| 4,215,425 | 7/1980 | Waggener | 367/83 |
| 4,590,593 | 5/1986 | Rodney | 367/83 |
| 4,642,800 | 2/1987 | Umeda | 367/85 |
| 4,730,281 | 3/1988 | Rodney et al. | 367/83 |
| 4,750,157 | 6/1988 | Shei | 367/190 |
| 4,878,206 | 10/1989 | Grosso et al. | 367/83 |

Primary Examiner—Deborah L. Kyle
Assistant Examiner—J. Woodrow Eldred
Attorney, Agent, or Firm—Fishman, Dionne & Cantor

[57] ABSTRACT

The present invention comprises a method and apparatus for estimating and identifying the channel filter characteristics of the drilling fluid communictions channel (e.g. standpipe) based on surface decoding of the MWD data signal. The channel filter characteristics can be mathematically defined by the transfer function of the channel. The transfer function is a mathematical model defining the input-output relationship of a physical system. The present invention may also characterize the channel filter defined by the drilling mud in the annulus between the borehole and the drillstring.

15 Claims, 8 Drawing Sheets

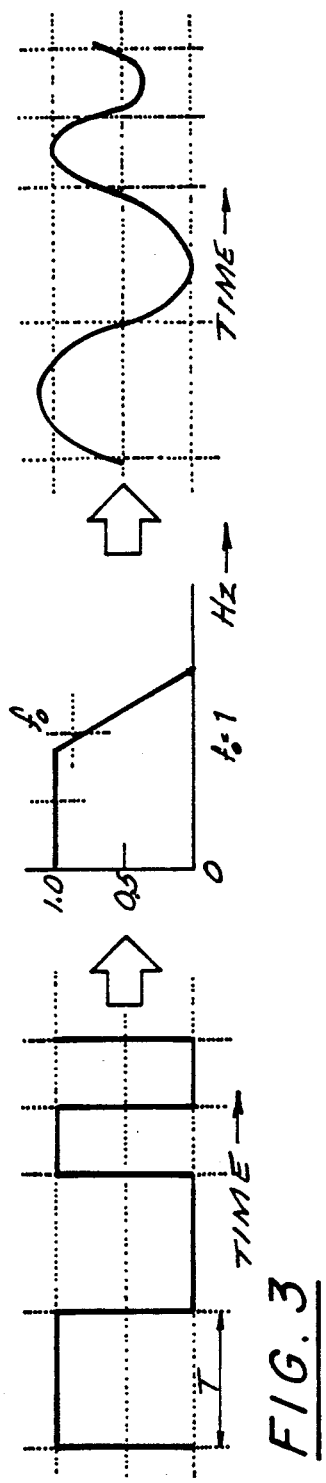
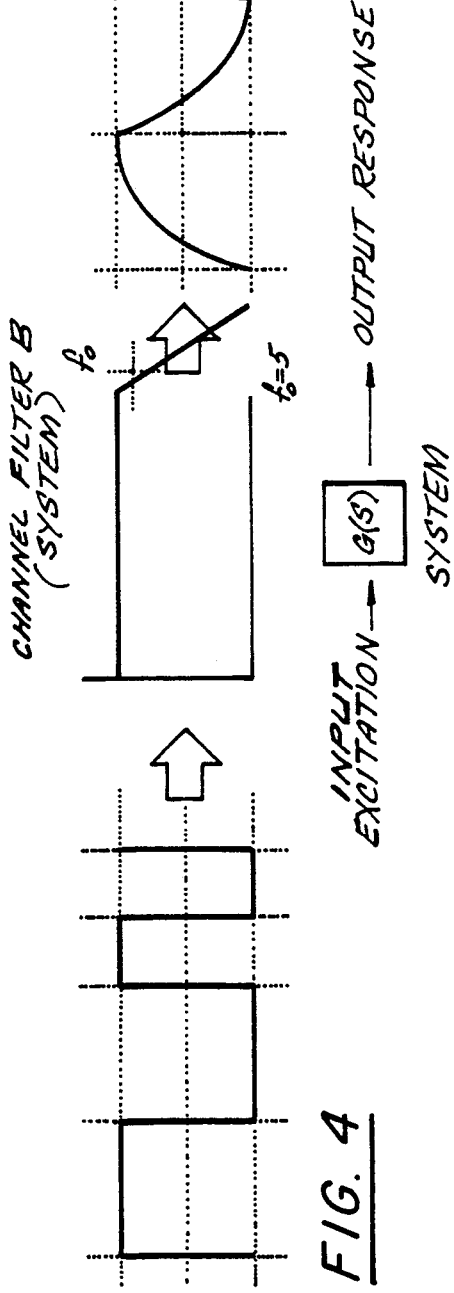
FIG. 3
FIG. 4
FIG. 5

ANALYSIS AND IDENTIFICATION OF A DRILLING FLUID COLUMN BASED ON DECODING OF MEASUREMENT-WHILE-DRILLING SIGNALS

BACKGROUND OF THE INVENTION

This invention relates generally to measurement-while-drilling (MWD) techniques used in oil and gas well drilling. More particularly, this invention relates to a method of estimating and identifying the channel filter characteristics of the drilling fluid communications channel based on surface decoding of the MWD signal.

In the drilling of oil and gas wells, efficient operation of the drilling apparatus, particularly as wells are drilled deeper and offshore activity increases, demands that data of interest to the driller be collected downhole and be sensed and transferred to the surface "continuously" i.e., without the lengthy delays which would be incident to stopping drilling and lowering test instruments down the borehole. In recent years, significant advances have been made in measurement-while-drilling (MWD) technology. For examples of MWD systems for use in the measurement of borehole directional parameters, reference may be had to U.S. Pat. Nos. 3,982,431, 4,013,945 and 4,021,774, all of which are assigned to the assignee of the present invention.

The measurement systems of the above-referenced patents utilize mud pulse telemetry to transmit information from the vicinity of the drill bit to the surface drilling platform. Mud pulse telemetry consists of the transmission of information via a flowing column of drilling fluid, i.e, mud, the information commensurate with the sensed downhole parameters being converted into a binary code of pressure pulses in the drilling fluid within the drill pipe or standpipe which are sensed at the surface. These pressure pulses are produced by periodically modulating the flowing mud column at a point downhole by mechanical means, and the resulting periodic pressure pulses appearing at the surface end of the mud column are detected by a pressure transducer conveniently located in the standpipe. The drilling mud is pumped downwardly through the drill pipe (string) and then back to the surface through the annulus between the drill string and the wall of the well for the purpose of cooling the bit, removing cuttings produced by the operation of the drill bit from the vicinity of the bit and containing the geopressure.

It will be appreciated that accurate decoding of the MWD data signal at the surface is essential to the drilling operation. It will also be appreciated that the MWD data signal will be altered between the mud pulse transmitter and the surface due to the transmission characteristics of the drilling mud in the standpipe. In other words, the mud filled standpipe may be analogized to a channel filter having certain channel characteristics as a transmission medium. In order to obtain accurate and successful decoding of the MWD signal pulse and thereby optimize the MWD communication, there is a need for identifying the mud channel's characteristics as a transmission medium.

SUMMARY OF THE INVENTION

The present invention comprises a method and apparatus for estimating and identifying the channel filter characteristics of the drilling fluid communications channel (e.g. standpipe) based on surface decoding of the MWD data signal. The channel filter characteristics can be mathematically defined by the transfer function of the channel. The transfer function is a mathematical model defining the input-output relationship of a physical system. The present invention may also characterize the channel filter defined by the drilling mud in the annulus between the borehole and the drillstring.

In accordance with the present invention, as the MWD data signal propagates up the mud column, the pressure pulses are converted to electrical (analog) signals by a pressure transducer located at the stand pipe or at the annulus, or at both. As is well known, the analog signals are passed through a signal conditioning board which converts the analog signals to digital signals. The digital signals are then passed through a digital filter that will behave as a trend removal algorithm to eliminate very low frequencies, any spurious pressure fluctuations, and any DC associated with the MWD signals. Next, the filtered signals are passed through a decoder, such as a zero crossing detection type decoder (as described in *Modern Instrumentation Tap Recording: An Engineering Handbook*, EMI Technology, Inc., p. 65 (1978); Library of Congress Catalog Card No. 78-60084) to detect one and zero binary coded information. As a result of such processing, the decoder will identify the bits being transmitted.

Next, and in accordance with the present invention, the data is passed to a novel channel identification (CHID) module. As mentioned, the received MWD signal at the surface will be distorted by the filtering characteristics of the mud column but usually not so much as to affect decoding. In the CHID module, the decoded bits will be used to reconstruct the MWD data that was transmitted. Knowing the signal that was transmitted (input) and the received signal at the surface, the transfer function of the channel can be determined in two ways: (a) a parametric modeling method where the data is used as a training sequence to generate an error which will be used to provide or build a dynamic model of the system or channel and its effect on the data; and (b) a non-parametric method which uses the input and output to run correlation and coherency analysis and obtain the transfer function of the channel.

The method of determining a downhole channel filter's transfer function in accordance with the present invention may be used to improve the MWD transmission by monitoring the channel characteristics and modifying the downhole tool's transmission in order to optimize signal detection. Such modification may include changing the pulse amplitude, code type or code frequency in order to optimize signal detection. In addition, based on information regarding the channel filter's characteristics derived from the present invention, certain drilling parameters such as flow rate may be changed in order to optimize signal detection.

The above-discussed and other features and advantages of the present invention will be appreciated and understood by the following detailed description and drawings.

BRIEF DESCRIPTION OF THE DRAWINGS

Referring now to the drawings, wherein like elements are numbered alike in the several FIGURES:

FIG. 3 is a graphical representation showing the effects of a first channel filter on the input and output MWD data signals;

FIG. 4 is a graphical representation showing the effects of a second channel filter on the input and output MWD data signals;

FIG. 5 is a block diagram of a transfer function;

DESCRIPTION OF THE PREFERRED EMBODIMENT

Figure 1:
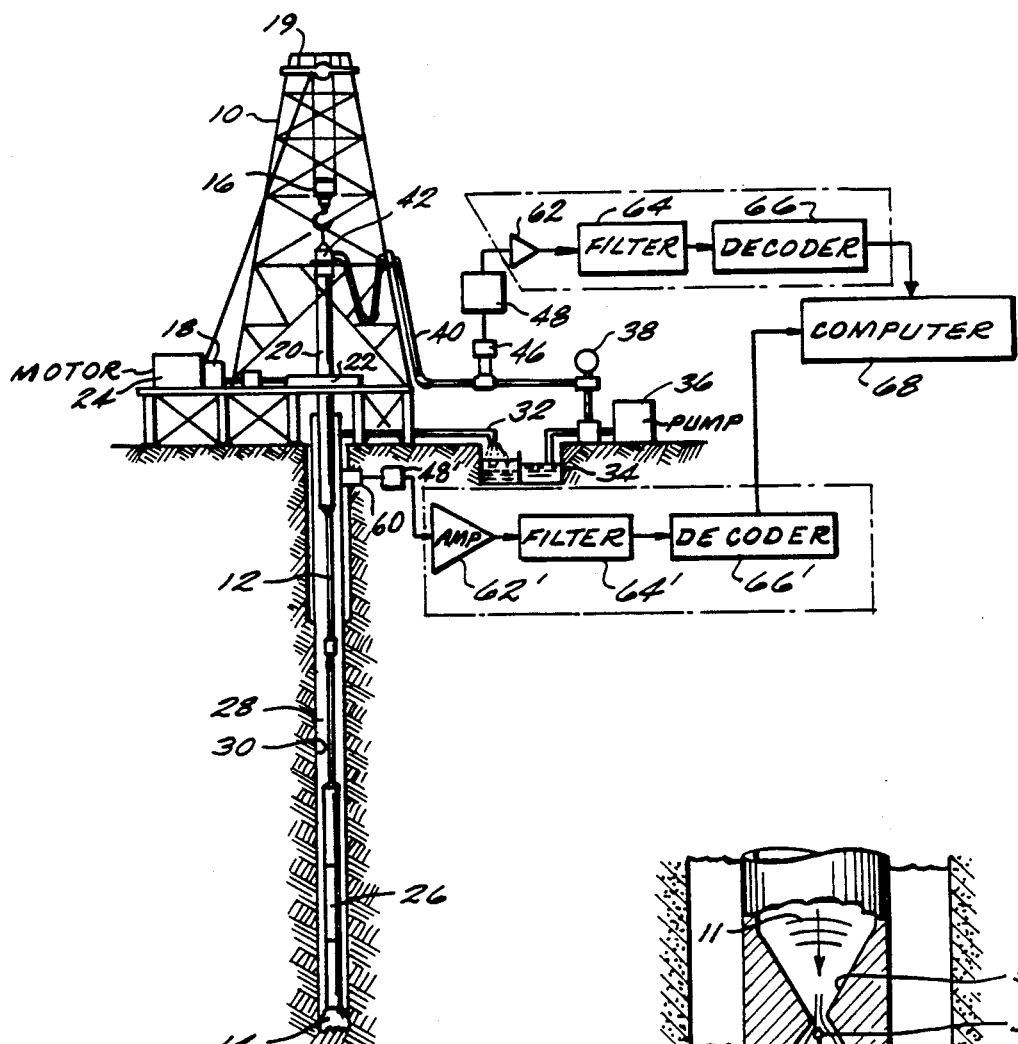
FIG. 1 is a diagrammatic view of a drill rig and apparatus used in accordance with this invention.

Referring to FIG. 1, a drilling apparatus is shown having a derrick 10 which supports a drill string or drill stem, indicated generally as 12, which terminates in a drill bit 14. As is well known in the art, the entire drill string may rotate, or the drill string may be maintained stationary and only the drill bit rotated. The drill string 12 is made up of a series of interconnected pipe segments, with new segments being added as the depth of the well increases. The drill string is suspended form a moveable block 16 of a winch 18 and a crown block 19, and the entire drill string of the disclosed apparatus is driven in rotation by a square Kelly 20 which slideably passes through and is rotatably driven by the rotatable table 22 at the foot of the derrick. A motor assembly 24 is connected to both operate winch 18 and drive rotary table 22.

The lower part of the drill string may contain one or more segments 26 of larger diameter than the other segments of the drill string. As is well known in the art, these larger diameter segments may contain sensors and electronic circuitry for preprocessing signals provided by the sensors. Drill string segments 26 may also house power sources such as mud driven turbines which drive generators, the generators in turn supplying electrical energy for operating the sensing elements and any data processing circuitry. An example of a system in which a mud turbine, generator and sensor elements are included in a lower drill string segment may be seen from U.S. Pat. No. 3,693,428 to which reference is hereby made.

Drill cuttings produced by the operation of drill bit 14 are carried away by a mud stream rising up through the free annular space 28 between the drill string and the wall 30 of the well. That mud is delivered via a pipe 32 to a filtering and decanting system, schematically shown as tank 34. The filtered mud is then drawn up by a pump 36, provided with a pulsation absorber 38, and is delivered via line 40 under pressure to revolving injector head 42 and then to the interior of drill string 12 to be delivered to drill bit 14 and the mud turbine in drill string segment 26.

Figure 2:
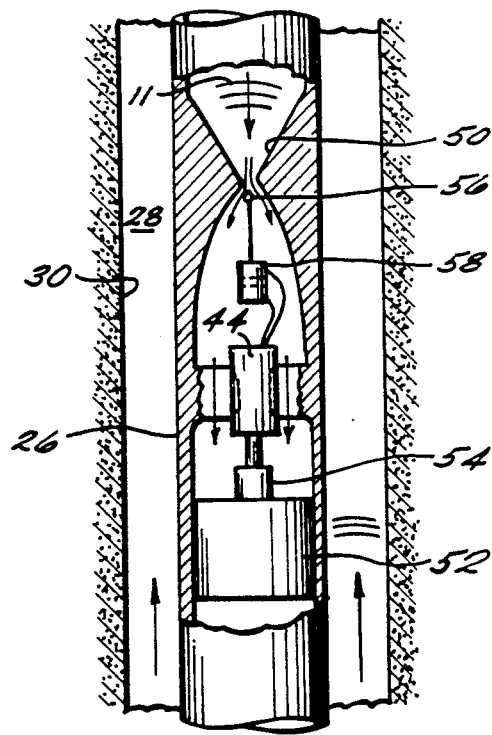
FIG. 2 is a side elevation view, partly in cross-section, of a MWD mud pulse telemetry apparatus.

In a MWD system as illustrated in FIG. 2, the mud column in drill string 12 serves as the transmission medium for carrying signals of downhole drilling parameters to the surface. This signal transmission is accomplished by the well known technique of mud pulse generation or mud pulse telemetry (MPT) whereby pressure pulses represented schematically at 11 are generated in the mud column in drill string 12 representative of parameters sensed downhole.

The drilling parameters may be sensed in a sensor unit 44 in drill string segment 26, as shown in FIG. 1 which is located adjacent to the drill bit. In accordance with well known techniques, the pressure pulses 11 established in the mud stream in drill string 12 are received at the surface by a pressure transducer 46 and the resulting electrical signals are subsequently transmitted to a signal receiving and decoding device (items 48, 62, 64 and 66) which may record, display and/or perform computations on the signals to provide information of various conditions downhole.

Still referring to FIG. 2, the mud flowing down drill string 12 is caused to pass through a variable flow orifice 50 and is then delivered to drive a turbine 52. The turbine 52 is mechanically coupled to, and thus drives the rotor of a generator 54 which provides electrical power for operating the sensors in the sensor unit 44. The information bearing output of sensor unit 44, usually in the form of an electrical signal, operates a valve driver 58, which in turn operates a plunger 56 which varies the size of variable orifice 50. Plunger 56 may be electrically or hydraulically operated. Variations in the size of orifice 50 create the pressure pulses 11 in the drilling mud stream and these pressure pulses are sensed at the surface by aforementioned transducer 46 to provide indications of various conditions which are monitored by the condition sensors in unit 44. The direction of drilling mud flow is indicated by arrows on FIG. 2. The pressure pulses 11 travel up the downwardly flowing column of drilling mud and within drill string 12.

Sensor unit 44 will typically include means for converting the signals commensurate with the various parameters which are being monitored into binary form, and the thus encoded information is employed to control plunger 56. The sensor 46 at the surface will detect pressure pulses in the drilling mud stream and these pressure pulses will be commensurate with a binary code. In actual practice the binary code will be manifested by a series of information bearing mud pulses of two different durations with pulse amplitude typically being in the range of 30 to 350 psi. The transmission of information to the surface via the modulated drilling mud stream will typically consist of the generation of a preamble followed by the serial transmission of the encoded signals commensurate with each of the borehole parameters being monitored.

Referring now to FIG. 3, it will be appreciated that the column of mud in stand pipe 12 defines a channel filter for the transmission of communications (MWD data signals in pressure pulses 11) between plunger 56 and pressure transducer 46. The input signal downhole at the pressure pulser 56 is depicted by the square waves in FIG. 3 which define a sequence of coded ones and zeros. As these input signals travel upwardly through the stand pipe, the channel filter having the characteristics shown as filter A in FIG. 3 will alter the MWD data pulses so that the output signal measured at the stand pipe has a much more rounded configuration. FIG. 4 is similar to FIG. 3 with FIG. 4 showing the MWD data signals passing through a mud column having different channel characteristics defined by channel filter B. As is clear from reviewing the output signals after the MWD data pulses have passed through channel filter B, channel B's characteristics allow more high frequencies to pass unattenuated and therefore more higher harmonics are present in the output signal.

The particular channel filter characteristics of a column of mud may be mathematically defined as the transfer function G(S). As shown in FIG. 5, the transfer function is a mathematical model defining the input-output relationship of a physical system such as the channel filter in the column of mud in the drill string (or in the annulus). The system response (output) is caused by system excitation (input). The causal relationship can be loosely defined as: Transfer Function G(S) = Output/Input.

Mathematically, the transfer function is defined as the Laplace transform of the output divided by the Laplace transform of the input (when all initial conditions in the system are set to 0). The frequency response function is defined in a similar manner and is related to the transfer function. Mathematically, the frequency response function is defined as the Fourier transform of the output divided by the Fourier transform of the input. As used herein, the term "transfer function" commonly refers to either of these, that is a time domain representation or a frequency domain representation and is used interchangeably.

Figure 6:
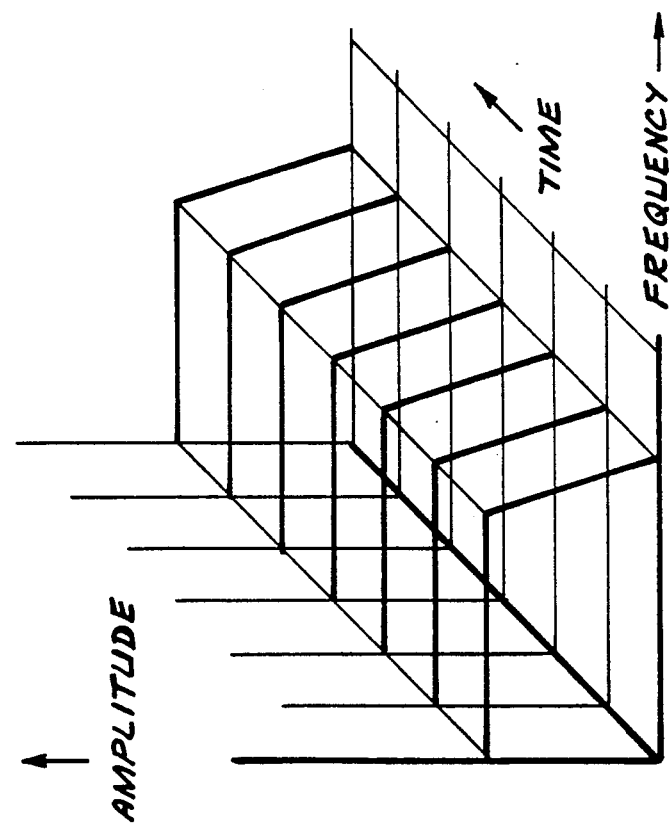
FIG. 6 is a graphical representation of the channel filter of FIG. 3 with respect to time.
Figure 7:
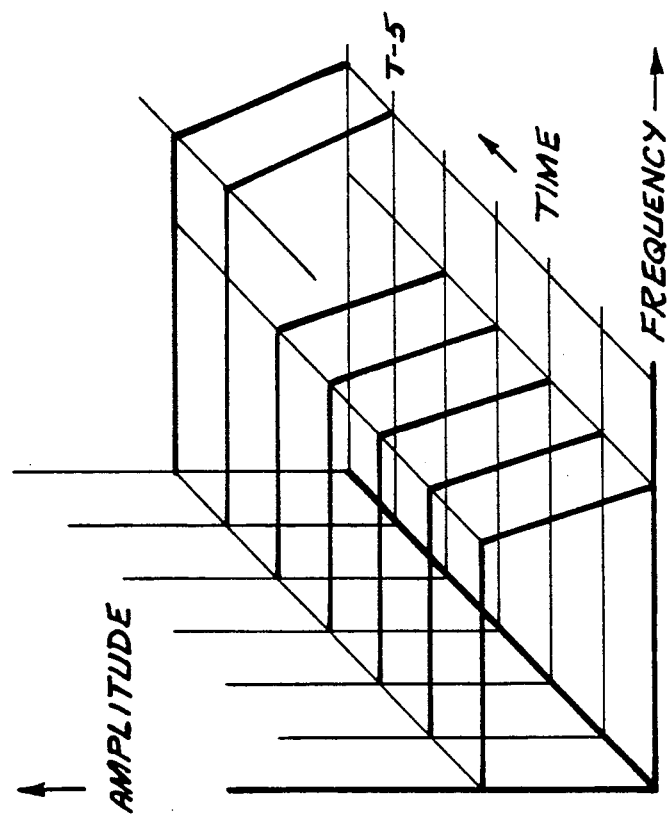
FIG. 7 is a graphical representation of the channel filter with respect to time with a change in character at t=5.

Channel filter characteristics in a given channel may change with respect to time as the channel will be influenced by a variety of different parameters. FIG. 6 is a graphical representation of channel filter A (FIG. 3) with respect to time wherein the channel filter characteristics are constant. FIG. 7 is a graphical representation of Channel Filter A wherein the channel filter characteristics are changed at time t=5 so that the new channel filter characteristics are commensurate with Channel Filter B (FIG. 4).

In accordance with the present invention and as will be described below, the mathematical characteristics of a particular channel filter may be estimated and identified. In addition, desired channel filter characteristics may be monitored so that changes in the channel filter characteristics with respect to time (as in FIG. 7) may be detected.

Figure 8:
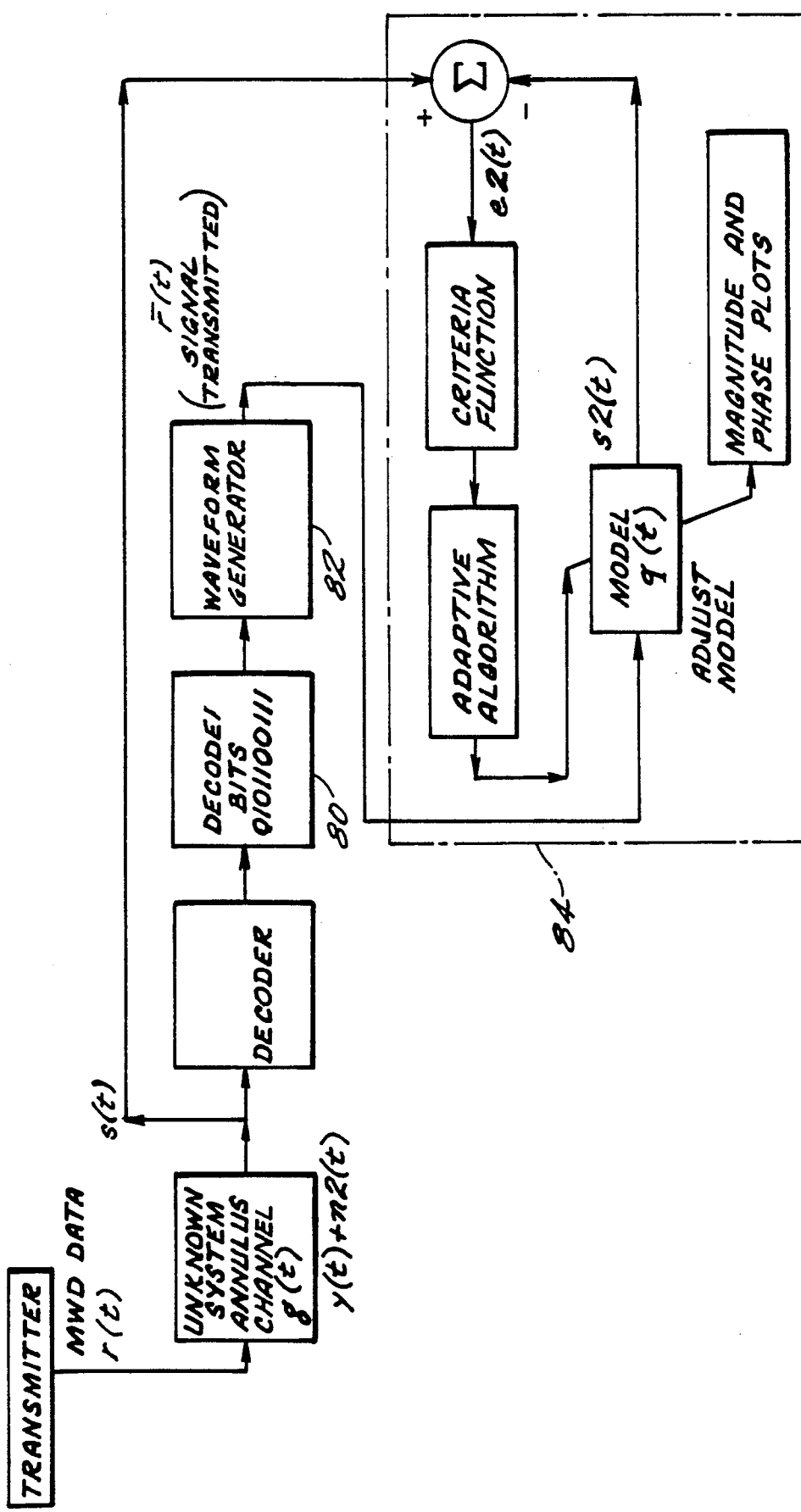
FIG. 8 is a block diagram of a channel identification module in accordance with the present invention.

Turning to FIG. 8, a block diagram depicting a method for identifying channel filter characteristics in accordance with the present invention is shown. Initially, the system input from a transmitter downhole will supply MWD raw data r(t) into an unknown system defined by the mud channel g(t). It will be appreciated that the MWD raw data r(t) will look like the input signals shown in either FIGS. 3 or 4. After the MWD data signal propagates up the mud column, the pressure pulses are converted to electrical signals by pressure transducer 46 located at the standpipe (or a pressure transducer 60 located at the annulus). The analog signals derived therefrom are passed through a signal conditioning board 48, 48' and converted to digital signals which are then passed to the decoder (66 or 66'). The signals will initially be amplified via amplifiers 62 or 62' and then passed through a digital filter 64, 64' that will behave as a trend algorithm to eliminate very low frequencies, any spurious pressure fluctuations and any DC associated with the MWD signal. The signal is then processed by a decoder 66 or 66' which detects the zero crossing points in the signal and which will identify the bits being transmitted as a series of zeros and ones. An example of a data decoded message is shown at 80 in FIG. 8. This decoded data is then passed to a waveform generator 82 which generates the original downhole shape such as shown in FIGS. 3 and 4. Waveform generator 82 then delivers the reconstructed waveform to the channel identification module 84 in accordance with this invention. In the channel identification module (CHID) 84, q(t) is the transfer function of the unknown mud channel system g(t). Initially, q(t) is estimated based on prior experience. Using this estimated q(t) as the starting point, the objective of the CHID 84 is to compare the output of the chosen model $s_2(t)$ to that of the unknown system s(t) to produce an estimation error $e_2(t)$. This error is used to choose q(t) so as to satisfy a certain criteria which is preferably to minimize the mean square error (MSE) $E(s(t)-s_2(t))^2$. The error $e_2(t)$ can be written as:

$$e_2(t) = s(t) - s_2(t) \quad 0 \leq t \leq T$$

where $$s(t) = \int_0^T g(t-v)r(v)dv + n_2(t)$$
$$= y(t) + n_2(t)$$

$$s_2(t) = \int_0^T q(t-v)r(v)dv$$

where T is the duration of the bit time (see FIG. 3); $n_2(t)$ is the channel noise; and v is a dummy variable.

There are many different ways of modeling the unknown system, and so there are different criteria functions of minimizing the error $e_2(t)$. If r(t) and y(t) are stationary processes, then $$S_{yr}(f) = G(f)S_{rr}(f)$$

where
$$y(t) = \int g(t-v)r(v)dv$$

$S_{yr}(f)$ is the cross power spectral density and $S_{rr}(f)$ is the auto power spectral density of r(t). The transfer function can then be written as:

$$G(f) = S_{yr}(f)/S_{rr}(f)$$

Both spectral estimation methods, the parametric and non-parametric methods are applied to determine and evaluate the unknown transfer function G(f) of the mud column. In the case of the non-parametric case, the Discrete Fourier Transform is applied to the ra data and to the output for the unknown system. Then, the auto and cross power spectral density are determined and solved for the transfer function G(f).

In the parametric case, the identification will be a linear model which has the linear differential equation:

$$s_2(t) + a_1s_2(t-1) + ... + a_ns_2(t-n)$$
$$= b_1\bar{r}(t-l) + ... + b_n\bar{r}(t-n) + e_2(t)$$

where $a_1,..., a_n$ and $b_1,..., b_n$ are the model parameters to be estimated and solved for. Several different digital processing methods of estimating and adjusting the model parameters are known which can be done in real time or in batch processing. These methods include, (a) steepest descent method, (b) stochastic method, (c) least squares method, and (d) instrumental variable method. Once the model parameters are estimated, G(f) can be solved.

Thus, an iterative process is utilized whereby the decoded system output is continuously monitored and used to adjust the model parameters until the summing function is substantially 0. At this point, the channel filter characteristics or transfer function of the channel filter has been determined for that point in time and may be plotted as amplitude and phase versus frequency (Bode plots).

If both signals in the annulus and stand pipe are measured, then the same analysis can be made without decoding the data and the channel characteristics of the drilling fluid communications channel can be identified. There are several ways in which this technique can be applied. FIGS. 8A through 8D illustrate four such ways.

Figure 8A:
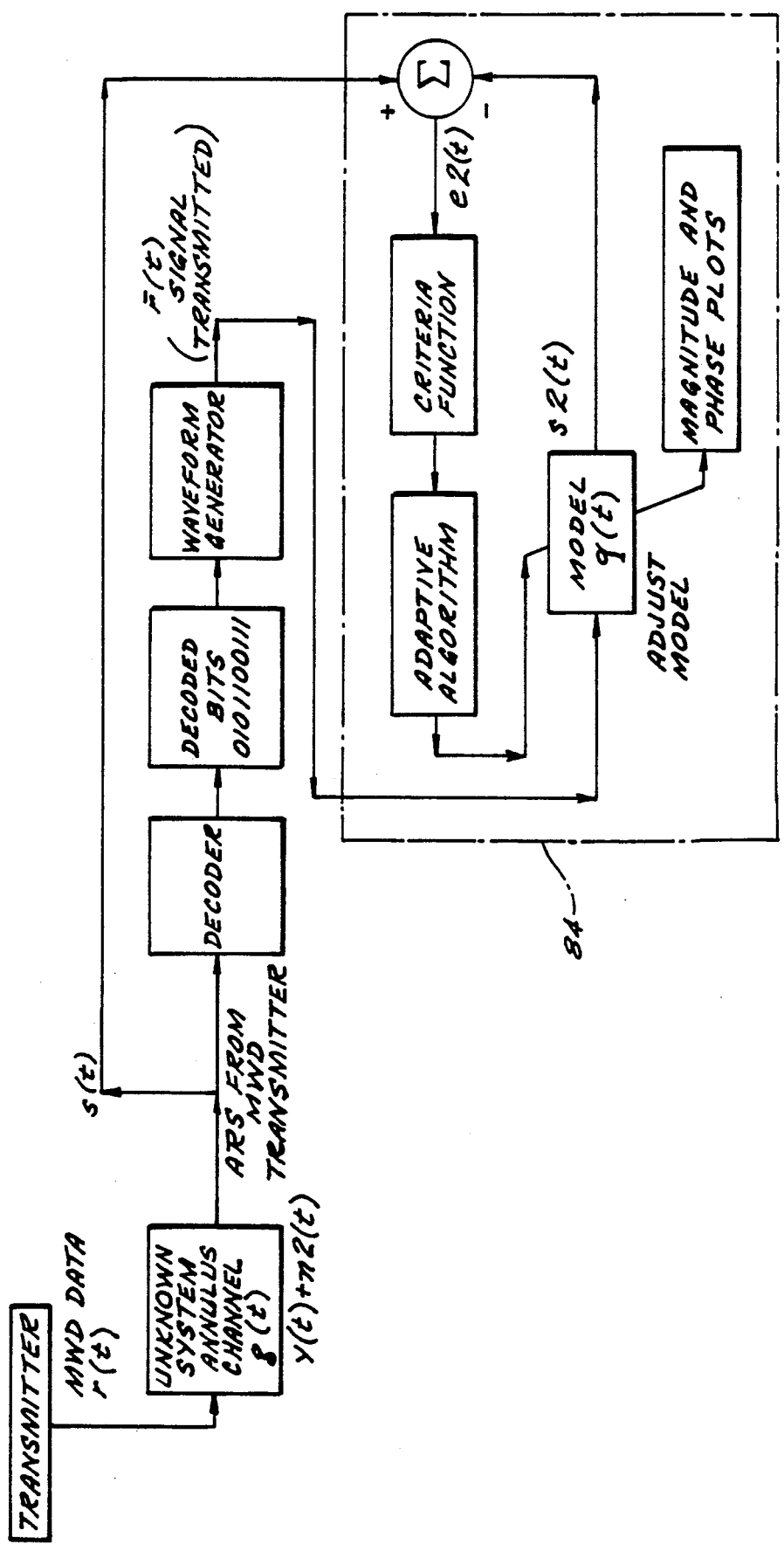
FIGS. 8A-8D are block diagrams depicting methods and apparatus for identifying the channel filter characteristics of a drilling fluid communications channel in accordance with the present invention.

FIG. 8A computes the annular transfer function using the decoded signal from the annulus. FIG. 8A illustrates how the technique of FIG. 8 detects the annular return signal (ARS) at the surface, reconstructs the signal as sent by the transmitter as described previously, and using this reconstructed signal, computes the transfer function of the annular channel in module 84.

Figure 8B:
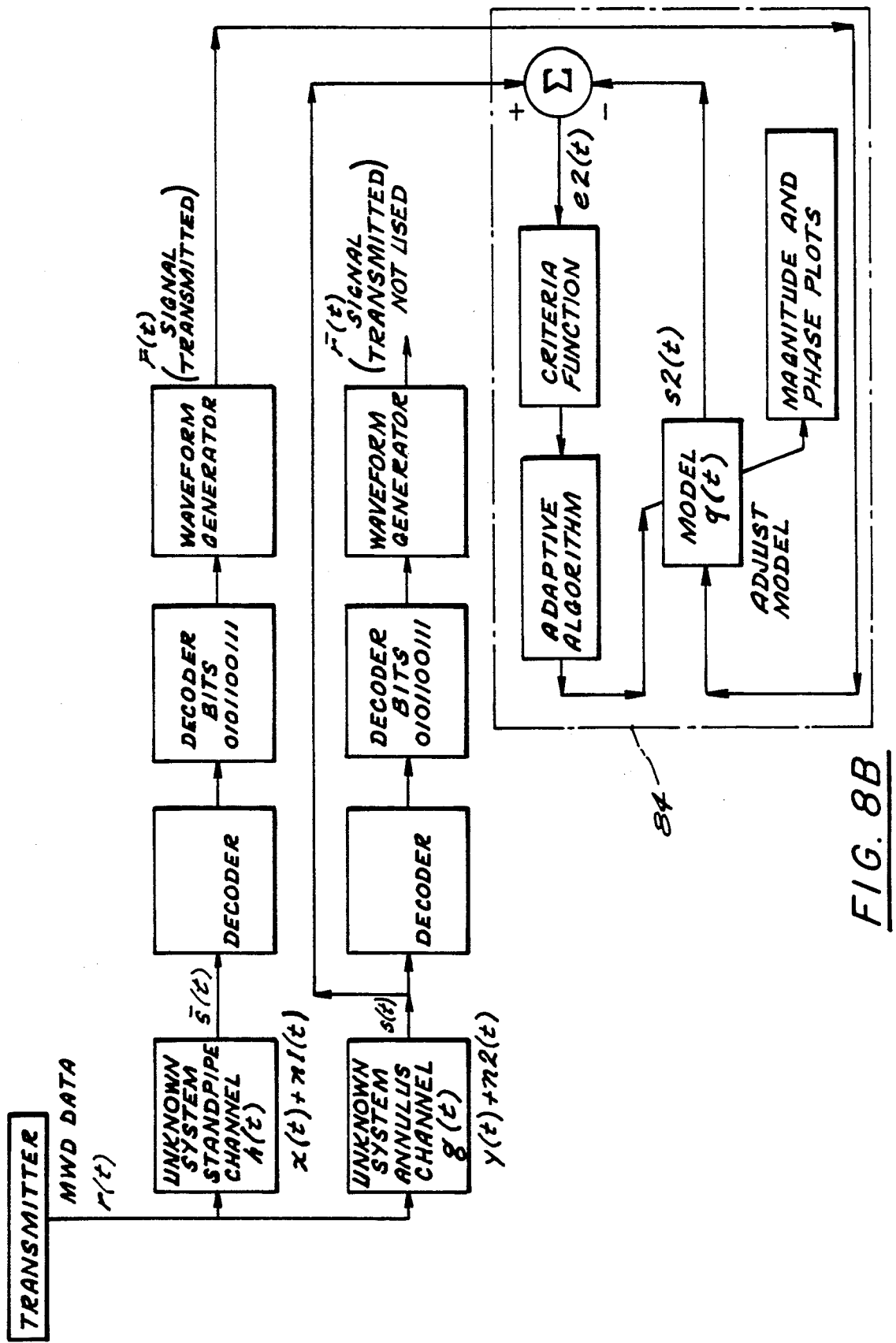

FIG. 8B computes the annular transfer function using the decoded results from the standpipe (SPP) signal to reconstruct the downhole signal. This is important when the annular signal received at the surface is so corrupt by noise or gas influx that it is undecodable.

Figure 8C:
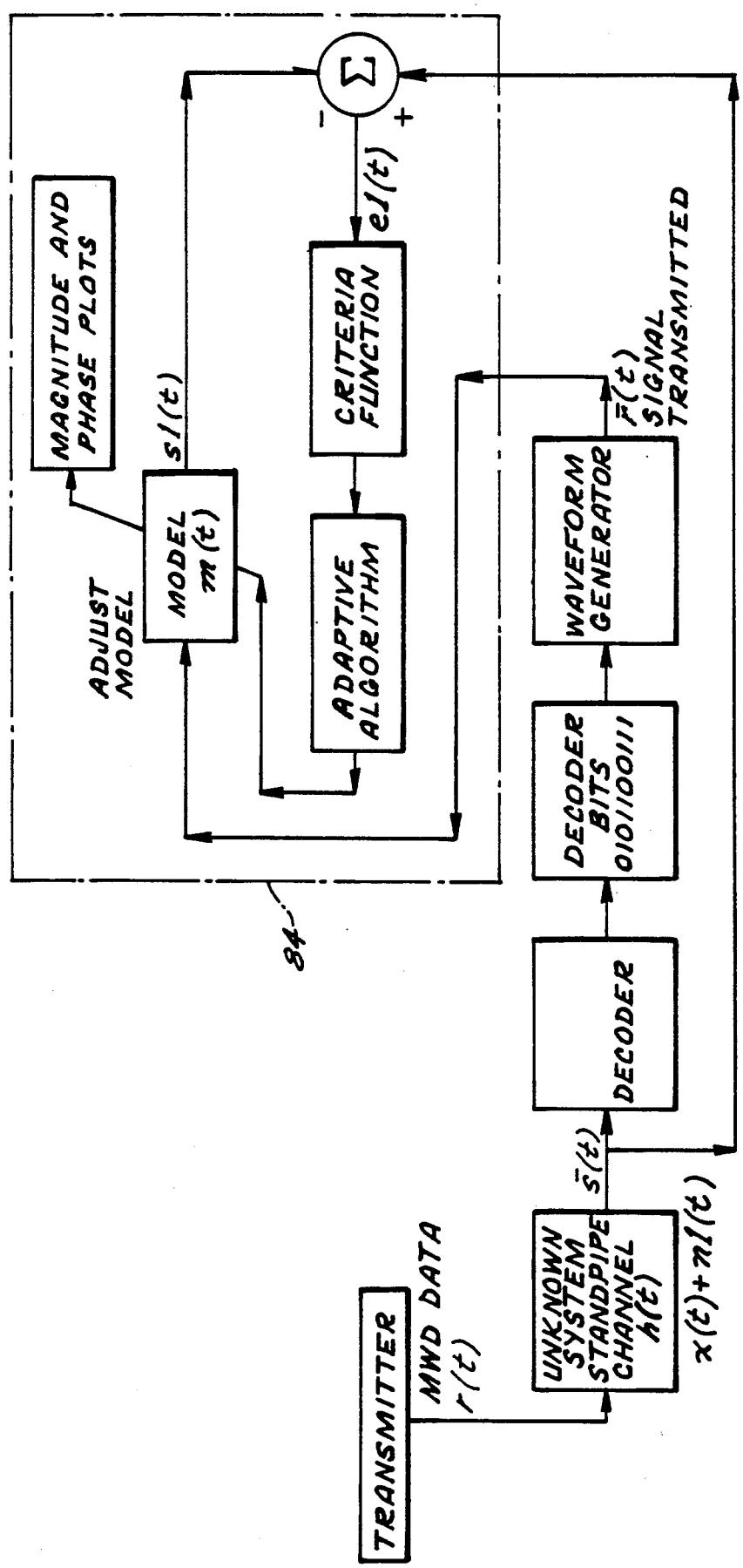

FIG. 8C is similar to FIG. 8 and shows the method of this invention used to create the transfer function of the standpipe channel using the decoded signal from the standpipe.

Figure 8D:
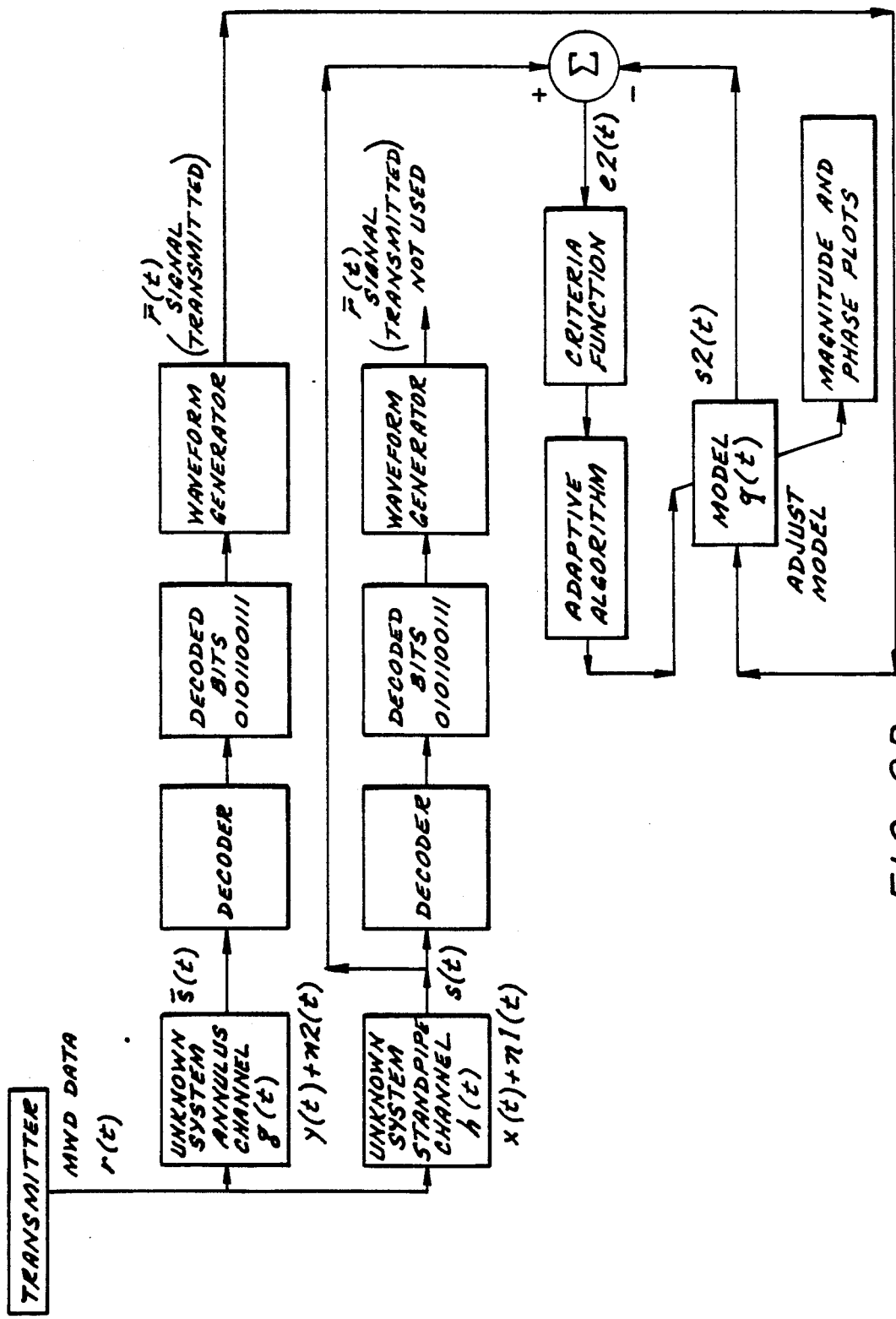

FIG. 8D depicts the method of this invention used to compute the transfer function of the standpipe channel using the decoded signal from the annulus.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of estimating the transfer function of a communications channel wherein the communications channel is defined by drilling fluid within the interior of a length of drill pipe or drilling fluid within the annulus between a borehole wall and a drillstring in the borehole, including the steps of:
    (1) transmitting an encoded downhole pressure pulse in response to a downhole signal through the communications channel, the downhole signal having a first waveform associated therewith, said first waveform defining an original waveform;
    (2) receiving the transmitted pressure pulse and converting the pressure pulse to a surface signal;
    (3) decoding the surface signal to define a decoded signal;
    (4) reconstructing the original waveform of the downhole signal by passing the decoded signal through waveform generator means so as to define a reconstructed waveform r(t); and
    (5) determining the transfer function q(t) of the communications channel by a comparative or iterative analysis of the reconstructed waveform r(t).

2. The method of claim 1 wherein the communications channel comprises the annulus and wherein the transmitted pressure pulse is received from the annulus.

3. The method of claim 1 wherein the communications channel comprises the annulus and wherein the transmitted pressure pulse is received from the interior of the drill pipe.

4. The method of claim 1 wherein the communications channel comprises the interior of the drill pipe and wherein the transmitted pressure pulse is received from the annulus.

5. The method of claim 1 wherein the communications channel comprises the interior of the drill pipe and wherein the transmitted pressure pulse is received from the interior of the drill pipe.

6. The method of claim 1 wherein the surface signal is an analog electrical signal and including the step of:
    converting the analog electrical signal to a digital surface signal.

7. The method of claim 6 wherein:
    said decoded signal comprises a binary signal.

8. The method of claim 1 wherein step (5) further comprises the steps of:
    (a) estimating a transfer function q(t) and generating a model waveform $s_2(t)$;
    (b) comparing $s_2(t)$ to s(t) and generating an estimation error $e_2(t)$; and
    (c) using $e_2(t)$ to select the transfer function q(t) of the communications channel so as to satisfy a preselected criteria.

9. The method of claim 8 wherein said step of satisfying said preselected criteria further comprises the step of:
    minimizing the mean square error.

10. The method of claim 8 including the step of
    repeating steps (a)–(c) in an iterative manner until $e_2(t)$ is substantially zero.

11. The method of claim 1 wherein step (5) further comprises the steps of:
    applying the Discrete Fourier Transform (DFT) to the reconstructed waveform r(t) and to the surface signal; and
    determining the auto and cross power spectral density to the DFT and solving for the transfer function g(t).

12. The method of claim 1 further including the steps of:
    monitoring the determined transfer function with respect to time; and
    modifying the transmission of pressure pulses based on the monitored transfer function in order to optimize signal detection at the surface.

13. The method of claim 12 wherein:
    said modifying step comprises changing the pulse amplitude, code type or code frequency.

14. The method of claim 1 further including the steps of:
    monitoring the determined transfer function with respect to time; and
    modifying at least one drilling parameter based on the monitored transfer function in order to optimize signal detection at the surface.

15. The method of claim 14 wherein:
    said modifying step comprises changing the drilling fluid flow rate.

* * * * *

UNITED STATES PATENT AND TRADEMARK OFFICE
CERTIFICATE OF CORRECTION

PATENT NO. : 5,055,837

DATED : Oct. 8, 1991

INVENTOR(S) : Ali H. Abdallah and Donald S. Grosso

Page 1 of 2

It is certified that error appears in the above-identified patent and that said Letters Patent is hereby corrected as shown below:

| | |
|---|---|
| Col. 2, Row 20 | Delete "Tap" and insert therefore -- Tape --. |
| Col. 3, Row 30 | Delete "form" and insert therefore "from". |
| Col. 6, Row 25 | Delete "q(t-v)r(v)dv" and insert therefore -- q(t-v)$\bar{r}$(v)dv --. |
| Col. 6, Row 35 | Delete "$\bigcup$" and insert therefore --$\int$--. |
| Col. 6, Row 41 | Delete "-". |
| Col. 6, Row 46 | Delete "ra" and insert therefore -- raw --. |
| Col. 6, Row 51 | Delete "differential" and insert therefore -- difference --. |
| Col. 6, Row 53 | In the first line of the equation, delete "p30" and insert therefore -- + --. |
| Col. 7, Row 47 | Delete "having" and insert therefore -- comprising --. |
| Col. 7, Row 57 | Delete "r(t)" and insert therefore -- $\bar{r}$(t) --. |
| Col. 7, Row 59 | Delete "or" and insert therefore -- and --. |

UNITED STATES PATENT AND TRADEMARK OFFICE
CERTIFICATE OF CORRECTION

PATENT NO. : 5,055,837

DATED : Oct. 8, 1991

INVENTOR(S) : Ali H. Abdallah and Donald S. Grosso

It is certified that error appears in the above-identified patent and that said Letters Patent is hereby corrected as shown below:

Col. 7, Row 60  Delete "r(t)" and insert therefore -- $\bar{r}(t)$ --.

Col. 8, Row 42  Delete "g(t)" and insert therefore -- q(t) --.

Signed and Sealed this

Nineteenth Day of October, 1993

BRUCE LEHMAN

*Attest:*

*Attesting Officer*   Commissioner of Patents and Trademarks